United States Patent [19]
Knobloch

[11] 3,894,079
[45] July 8, 1975

[54] PREPARATION OF 2,5-DIBROMOTEREPHTHALIC ACID

[75] Inventor: James O. Knobloch, Naperville, Ill.

[73] Assignee: Standard Oil Company, Chicago, Ill.

[22] Filed: Dec. 29, 1972

[21] Appl. No.: 319,500

[52] U.S. Cl...... 260/515 A; 260/544 D; 260/544 M
[51] Int. Cl................... C07c 63/26; C07c 63/30
[58] Field of Search........ 260/515 A, 544 D, 544 M

[56] References Cited
UNITED STATES PATENTS

| | | | |
|---|---|---|---|
| 1,997,226 | 4/1935 | Mueller | 260/515 |
| 3,142,701 | 7/1964 | Wilkinson | 260/515 |

*Primary Examiner*—James A. Patten
*Attorney, Agent, or Firm*—William H. Magidson; Arthur G. Gilkes; William T. McClain

[57] ABSTRACT

2,5-dibromoterephthalic acid, an intermediate used for flame retardant applications, is prepared from terephthalic acid, in a single step, by brominating terephthalic acid in chlorosulfonic acid or fluorosulfonic acid, containing sulfur trioxide and employing an iodine catalyst. The reaction is carried out under mild conditions. The products, 2,5-dibrometerephthalic acid, with lesser amounts of terephthalic acid, bromoterephthalic acid, tribromoterephthalic acid, and tetrabromoterephthalic acid, are recoverable either by filtration of the cooled bromination suspension or by distillation of the chlorosulfonic or fluorosulfonic acid solvent and the further hydrolysis of the brominated terephthalic acid product.

4 Claims, No Drawings

PREPARATION OF 2,5-DIBROMOTEREPHTHALIC ACID

BACKGROUND OF THE INVENTION

The recent growth in the use of flammable materials has increased the incidences of damage and personal injury by fire. Concern for public safety has prompted government agencies to impose stricter flammability standards for those applications where synthetic materials are used. As a result, the use of halogen containing compounds, particularly chlorine and bromine containing compounds as additives or as an integral part of a finished polymer to impart fire retardant properties to polymeric materials is a rapidly growing industry of great commercial importance. Such compositions can be utilized in those areas of application where fire is likely to occur and to prevent substantial danger or hazard to individuals or property. Examples of such applications are use of polymeric material in household appliances, building materials, the auto industry, the aircraft industry, and others. The seriousness of the potential danger from combustible materials has spurred activity on the part of various government regulatory bodies. Thus, several government agencies are setting flammability standards for autos, aircraft, carpets and other articles made from synthetic polymeric materials. In response to these pressures, makers of synthetic polymeric materials are increasing their efforts to impart flame retardant properties to their products.

An object of this invention is to provide an intermediate compound containing bromine that may be used to form fire retardant polymeric products. Such products would include synthetic polyesters that may find use in a variety of applications where a high degree of flame retardancy or self-extinguishing properties are desirable or necessary.

My invention relates to the preparation of 2,5-dibromoterephthalic acid, a valuable intermediate to be used to form flame retardant polymers wherein bromine is reacted with terephthalic acid in chlorosulfonic or fluorosulfonic acid in the presence of an iodine catalyst.

An East German patent (Ger-East 14,750, issued May 14, 1958, CA53,10132) describes the tetrabromination of phthalic anhydride in chlorosulfonic acid with a sulfur catalyst at temperature conditions of 145° to 150°C. My novel process is distinguished from this method in that it unexpectedly allows terephthalic acid to be brominated to form 2,5-dibromoterephthalic acid under mild temperature conditions of from 40° to 80°C, with lower temperatures desirable to minimize overbromination.

SUMMARY OF INVENTION

Pursuant to my invention, 2,5-dibromoterephthalic acid is best prepared by adding terephthalic acid to a solution of chlorosulfonic acid or fluorosulfonic acid containing sulfur trioxide. Bromine and an iodine catalyst are added. The reaction proceeds and is held at a temperature of between 40° to 80°C, preferrably, 40° to 55°C, for a period of from 1 to 10 hours. When fluorosulfonic acid is used as the solvent there is very little if any substitution of fluorine in the aromatic ring of terephthalic acid, since fluorosulfonic acid is a more stable compound, therefore fluorosulfonic acid is a highly desirable solvent.

The reaction occurring can be represented by the following equation:

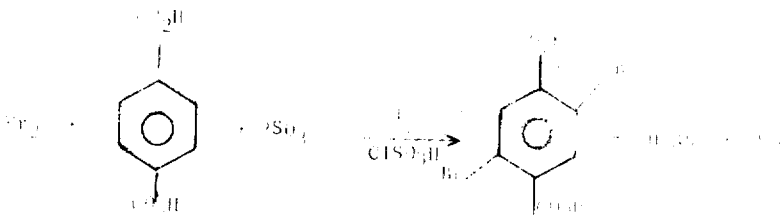

The preparation of 2,5-dibromoterephthalic acid of the present invention is more specifically illustrated by the following examples:

EXAMPLE 1

The bromination apparatus consisted of a 250 ml, 3-neck flask equipped with a heating mantle, a thermometer in the liquid phase, an 8-tray Oldershaw column equipped with a cold-finger (−75°C) reflux condenser, a liquid-dividing reflux head and a receiver cooled to −65°C. Chlorosulfonic acid (98.5 grams) was added to the flask first; then with stirring 105.5 grams of sulfur trioxide was added (temperature rose to 46°C) followed by 34.1 grams terephthalic acid (TA). (The terephthalic acid used contained 0.94% isophthalic acid). The exterior of the flask was cooled so that the final temperature was 52°C. The following day 0.5 grams iodine and 35.5 grams of bromine were added. Light was excluded by an aluminum foil flask cover. The flask was heated from 24° to 45°C (pot temperature) in 26 minutes, then peaked at 55°–60½°C and settled back down to 40°–44°C after 7 minutes. The heating mantle was lowered during this exothermic part of the reaction and an ice bath was used. Thereafter heat was applied. The reaction was held in the 44°–54°C range for 7 hours. The column head dropped to −8½°C to −10°C and the reflux ratio (column return to take-off) was varied between 40:1 and 80:1 to control the pot temperature. Three milliliters of sulfur dioxide were collected in the receiver.

The following day the 266.4 grams remaining in the flask was centrifuged, and recycled three times to recover most of solids. The cake was then washed on the centrifuge with 50 ml 66°B'e sulfuric acid. The acid wet cake (85.3 grams) was cautiously added to 300 ml ice water, digested 3 hours, cooled in an ice bath, and filtered, washing with 50 ml distilled water. After drying 22 hours (at 50°C and under a vacuum), the cake weighed 45.6 grams.

The chlorosulfonic acid filtrate (112.8 grams) was allowed to stand near the steam bath to gradually absorb water. The following day it was poured on 400 grams of ice, digested on the steam bath, cooled, filtered (with 25 ml of distilled water wash) and then dried to yield 9.2 grams of solid material (called "Mother Liquor Solids").

The sulfuric acid wash (101.0 grams) was worked up in the same way as the chlorosulfonic filtrate to yield 7.8 grams of dry "$H_2SO_4$ wash solids".

Each of the three solid samples were methylated with diazomethane alone and with tetrabromoterephthalic acid as an internal standard. The methylated solutions were stripped of all excess diazomethane and ether under a vacuum at low temperature. Residues were analyzed by gas chromatography. Peak identifications were made by a gas-chromatograph attached to a mass spectrometer. The results are shown in Table I in area percent. Factors were known for the brominated terephthalic acids, so these are also reported (values in parentheses) as weight percent.

TABLE I

PRODUCTS FROM BROMINATION OF TEREPHTHALIC ACID: ANALYSES

Run 2070-198

|  | Centrifuge Cake | Mother Liquor Solids | $H_2SO_4$ Wash Solids |
|---|---|---|---|
| Weight | 45.6 g | 9.2 g | 7.8 g |
| Terephthalic Acid (TA) | Trace | .22 (.067) | .33 (.14) |
| Bromoisophthalic Acid | — | .07 | .19 |
| BrTA | .55 (.41) | — | 1.13 (.70) |
| $Cl_2$TA | .17 | .21 | .29 |
| BrClTA | 4.73 | 1.43 | 5.33 |
| $Br_2$TA | 93.1 (89.1) | 8.34 (4.98) | 73.0 (60.8) |
| $BrCl_2$TA | — | 1.07 | — |
| $Br_2$ClTA | — | .84 | .54 |
| $Br_2Cl_2$TA | .24 | 10.85 | 2.25 |
| $Br_3$TA | .12 (.15) | .31 (.23) | .44 (.47) |
| $Br_3$ClTA | .47 | 31.4 | 6.47 |
| $Br_4$TA | .60 (.91) | 45.6 (41.1) | 10.0 (13.0) |
| Totals | 99.98 | 100.34 | 99.97 |

Table II shows the mole % yields that were obtained.

TABLE II

| | Yield (Mole % on TA Charged) | | | |
|---|---|---|---|---|
| | Centrifuge Cake | Mother Liquor Solids | $H_2SO_4$ Wash | Total |
| Terephthalic Acid (TA) | — | .018 | .032 | .050 |
| BrTA | .376 | — | .110 | .486 |
| $Br_2$TA | 61.8 | .697 | 7.21 | 69.7 |
| $Br_3$TA | .084 | .026 | .044 | .154 |
| $Br_4$TA | .424 | 3.87 | 1.04 | 5.33 |
| | | | Total | 75.72 |

Thus a yield of 69.7 mole % 2,5-dibromoterephthalic acid, showing an 89.1 wt% purity was demonstrated. One major contaminent was observed in the crude cake, that being bromochloroterephthalic acid.

EXAMPLE 2

A 1-liter 4-neck creased flask equipped as in Example 1 but without a column (a water-cooled reflux condenser was used in place of column) was used. The charge consisted of 83.2 grams of freshly distilled terephthaloyl chloride (0.410 moles), 711.1 grams chlorosulfonic acid, 83.4 grams sulfur trioxide (1.043 moles), 1.01 grams iodine and 70.0 grams of bromine (0.438 moles). The reaction solution was heated from 32° to 65°C in 1 hour, then held at 65°–74°C for 3¾ hours. A little bromine was lost, carried off with escaping sulfur dioxide gas. After cooling the solution weighed 934.8 grams and was divided into three weight aliquots.

The first aliquot (298.8 grams) was vacuum stripped (pot temp. 76°–101°C) to remove chlorosulfonic acid. The residue (69.2 grams) was suspended in 200 cc carbon tetrachloride, stirred for 20 minutes and then pressure filtered through fritted glass. The insolubles remaining were dried amounting to 37.3 grams. The infrared spectrum as a KBr disc showed a strong carbonyl absorption at about 1,700 $cm^{-1}$ with very slight shoulders at 1,690 and 1,715 $cm^{-1}$. 2,5-Dibromoterephthalic acid has a carbonyl abosrption at 1,700 $cm^{-1}$. The carbon tetrachloride extract (filtrate) was stripped of solvent under vacuum and reduced to 25.5 grams residue.

From 11.5 grams of this residue, we obtained 2.8 grams of sublimate and 3.6 grams of bottoms. The sublimate has a carbonyl absorption at 1,772 $cm^{-1}$ which may be due to 2,5-dibromoterephthaloyl bromide, since 2,5-dibromoterephthaloyl chloride has a carbonyl absorption at 1,756 $cm^{-1}$. This shift in carbonyl absorption is almost identical to the 1795 to 1810 difference between acyl chloride and acyl bromide respectively reported by Dyer in "Applications of Absorption Spectroscopy of Organic Compounds," Prentice-Hall 1965, p 35.

A second aliquot (361.4 grams) of the chlorosulfonic acid solution was vacuum stripped (78°C pot maximum) to a residue of 137.8 grams. This was allowed to contact moist air overnight and then mixed with 200 ml water and digested on the steam cone four hours. It was then cooled in an ice bath, filtered, and washed with 20 ml distilled water. The 58.9 grams of dry residue was refluxed 24 hours in 735 ml absolute methanol. On cooling, a 21.6 grams (dry wt.) insoluble cake was recovered. The methanol solution was evaporated to leave 39.0 grams dry residue. Samples of both products were further esterified with diazomethane and analyzed employing an internal standard. The results are shown in Table III.

TABLE III

PRODUCTS FROM BROMINATION OF TEREPHTHALOYL CHLORIDE: HYDROLYZED, REACTED WITH $CH_3OH$ AND $CH_2N_2$

Area % (wt %)

|  | $CH_3OH$ Insoluble | $CH_3OH$ Soluble |
|---|---|---|
| Weight | 21.6 g | 39.0 g |
| Analysis by G. C., Area % (Wt%) |  |  |
| $C_6Cl_6$ | 0.99 | 0.91 |
| TA | 0.41 (.18 wt%) | 25.8 (8.06) |
| Unknown |  | .70 |
| BrTA |  | .71 (.34) |
| BrClTA | 6.05 | 1.86 |
| $Br_2TA$ | 90.6 (80.8) | 24.3 (14.6) |
| $Br_2ClTA$ | .93 | 7.12 |
| $Br_2Cl_2TA$ | .082 | 2.45 |
| $Br_3TA$ | — | 2.11 (1.47) |
| $Br_3ClTA$ | .152 | 8.86 |
| $Br_4TA$ | .441 (.63) | 25.0 (23.8) |

The components for which factors were known for converting area to weight percent give the following yields:

Yield (mole % on TA Charged)

|  | $CH_3OH$ Insoluble | $CH_3OH$ Soluble | Total |
|---|---|---|---|
| TA | .147 | 11.9 | 12.0 |
| BrTA | — | .341 | .341 |
| $Br_2TA$ | 33.8 | 11.1 | 44.9 |
| $Br_3TA$ | — | .895 | .895 |
| $Br_4TA$ | .177 | 12.1 | 12.3 |
|  |  |  | 70.4 |

When fluorosulfonic acid was used in place of chlorosulfonic acid, the results were very similar to the examples shown, except that there was almost no fluorine substitution in the aromatic ring of terephthalic acid.

What I claim is:

1. A process for the preparation of a 2,5-dibromoterephthalic acid compound, which comprises reacting a terephthalic acid compound in a solution of chlorosulfonic acid or fluorosulfonic acid containing sulfur trioxide, in the presence of iodine with bromine at 40° to 80°C.

2. The process of claim 1, wherein said temperature is 40° to 55°C.

3. The process of claim 1, wherein said terephthalic acid compound comprises terephthalic acid.

4. The process of claim 1, wherein said terephthalic acid compound comprises terephthaloyl chloride.

* * * * *